I. A. WENDELL.
LATHE.
APPLICATION FILED MAR. 31, 1908.
917,389.
Patented Apr. 6, 1909.
2 SHEETS—SHEET 2.
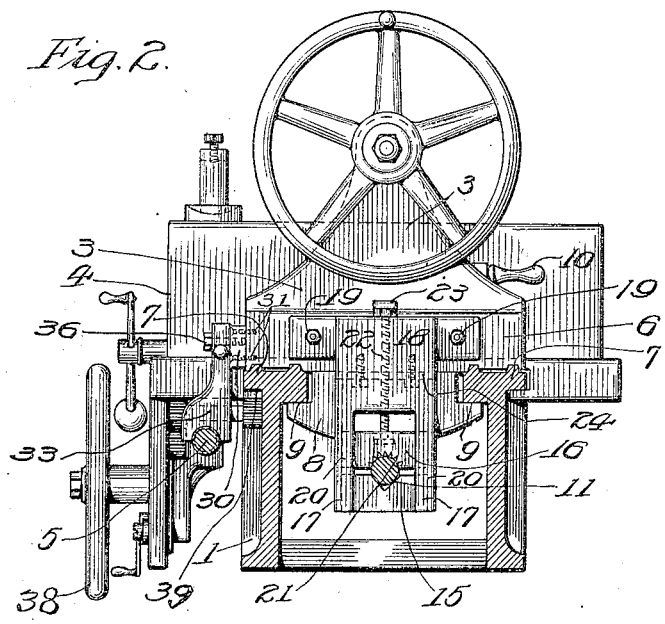
WITNESSES
INVENTOR
Isaac A. Wendell.
BY
ATTORNEY

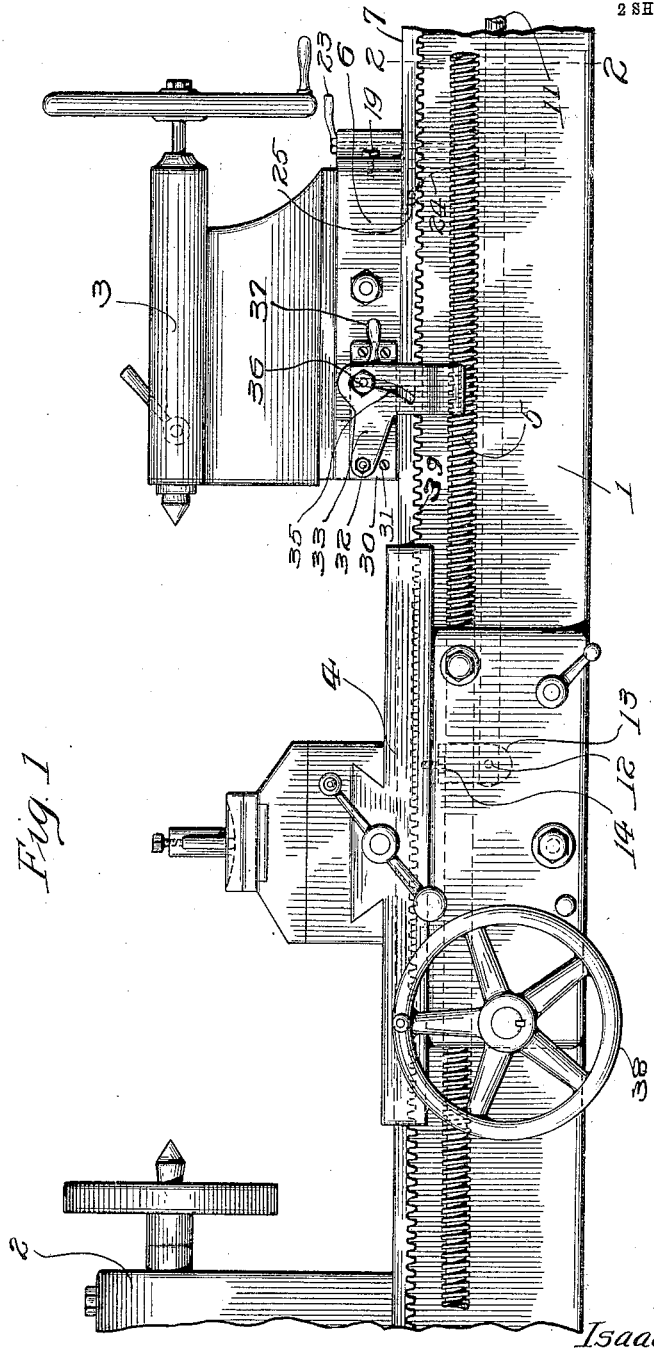

UNITED STATES PATENT OFFICE.

ISAAC A. WENDELL, OF PHILADELPHIA, PENNSYLVANIA, ASSIGNOR OF ONE-HALF TO HENRY A. WENDELL, OF PHILADELPHIA, PENNSYLVANIA.

LATHE.

No. 917,389.   Specification of Letters Patent.   Patented April 6, 1909.

Application filed March 31, 1908. Serial No. 424,339.

*To all whom it may concern:*

Be it known that I, ISAAC A. WENDELL, a citizen of the United States, and a resident of Philadelphia, county of Philadelphia, and State of Pennsylvania, have invented certain new and useful Improvements in Lathes, of which the following is a full, clear, and exact description, reference being had to the accompanying drawings, forming a part of this specification.

My invention relates particularly to improvements in attachments, which are especially intended for use upon engine lathes such as are generally found in machine shops.

The main object of my invention is to provide means whereby the tail stock of a lathe may be automatically moved either simultaneously with the tool carriage of the lathe, or independently thereof.

Further objects of my invention will appear in the following description.

In the accompanying drawings: Figure 1 is a side elevation of an engine lathe provided with attachments constructed and applied in accordance with this invention; Fig. 2 a transverse section on line 2—2 of Fig. 1; Fig. 3 a perspective of one of the attachments; and Fig. 4 is a perspective of a detail of a second attachment.

The drawings show an engine lathe of the usual type having a bed 1, a head stock 2, a tail stock 3, and a tool carriage 4 which is actuated by the usual lead screw 5. The tail stock 3 comprises the usual slider 6 resting upon the ways 7 of the bed, and the usual clamping plate 8 engaging against the under surfaces 9 of the ways. The clamping plate 8 is provided with the usual means, such as the handle 10 and suitable connections for tightening the clamping plate against the ways to lock the tail stock in any desired position, and when the clamping plate 8 is slightly loosened by means of the handle the tail stock is free to slide upon the ways longitudinally of the bed.

Between the tool carriage 4 and the tail stock 3, I have provided a connection in the form of a rigid bar 11 which is preferably cylindrical in shape and is constructed of machinery steel or any other suitable material. This bar is pivoted at its inner end by means of a bolt 12 between the two sides of a yoke 13, which is rigidly secured upon the under side and centrally of the carriage by means of bolts 14. The opposite end of the bar 11 is slidably mounted between the jaws 15 and 16 which are arranged in vertical alinement between the side arms 17 of the yoke 18 which is rigidly secured to the rear end of the tail stock by means of bolts 19. The lower jaw 15 of the clutch is rigid with the outer ends of the arms 17 of the yoke and is provided in its upper surface with a substantially V-shaped groove in which rests the bar 11. The upper jaw 16 is vertically slidable in grooves 20 upon the inner edges of the jaws of the yoke and is provided upon its lower edge with a substantially V-shaped groove 21, the surfaces of which are preferably serrated, so as to grip firmly the bar 11, and is held adjustably against the bar by means of a screw 22 which extends through the upper portion of the yoke and which is provided upon its upper end with a handle 23, whereby it may be turned. The yoke is further secured to the tail stock and held in rigid position by means of a brace 24 upon the inner side of the yoke, the inner end of the brace being secured to the under side of the tail stock by means of bolts 25. By means of this connection between the tool carriage and tail stock it is evident that the tail stock may be conveniently and rigidly clamped to the bar 11, whereby the tail stock may be caused to move in unison with the tool carriage, which is advantageous in many kinds of work.

It is sometimes desirable to have the tail stock slide upon the bed of the lathe independently of the carriage and in order that such movement may be accomplished uniformly and without any manual effort, I have provided upon one side of the tail stock, an attachment adapted to engage with the lead screw, whereby the tail stock may be carried by the lead screw. This attachment comprises a plate 30 which is rigidly secured to one side of the tail stock above the lead screw by means of the bolts 31. Mounted upon this plate and pivoted thereto by means of a bolt 32 is a bracket 33, the lower end of which is provided with a threaded recess 34 adapted to engage with the threads of the lead screw to move the tail stock. The bracket 33 is also provided with an elongated circular slot 35 concentric with the pivot bolt 32 of the bracket, and a bolt 36 is arranged through this slot and threaded in the plate 30 forming the support of the bracket to hold the bracket either in or out of engagement with the lead screw as occasion may require. A handle 37 is also provided on the bracket, whereby the bracket may be conveniently operated.

It is obvious that when the bracket attached to the side of the tail stock is in engagement with the lead screw the tail stock may be automatically moved upon its bed by the lead screw independently of the carriage, or in unison therewith as may be preferred.

The connection of the tail stock to the carriage by means of the bar 11 makes it possible to actuate the tail stock through the movement of the carriage independently of the lead screw, the carriage being moved as usual by means of the hand wheel 38 upon the carriage, the rack 39 upon the bed and the usual intermediate connections between the wheel and the rack, and this automatic movement of the tail stock independently of the lead screw obviously could not be accomplished by the use of the bracket attached to the side of the tail stock.

From this description it is apparent that although both the bar and the bracket attachments are capable of performing some of the same functions, yet each can accomplish results not possible with the other and therefore both attachments are useful in the same lathe.

It is obvious that many changes might be made in the details of the construction, within the scope of the appended claims, without departing from the spirit of this invention or sacrificing any of the advantages thereof.

Having thus fully described my invention, I claim and desire to secure by Letters Patent of the United States:—

1. In a lathe, the combination with a bed, of a tool carriage and a tail stock movable thereon, a bar pivoted to said carriage and a clutch upon said tail stock engaging said bar.

2. In a lathe, the combination with a bed, of a tool carriage and a tail stock movable thereon, a bar secured at one end to said carriage, and a clutch secured to said tail stock, and engaging said bar, said clutch being provided with a jaw beneath said bar having a smooth recess therein and a jaw above said bar having a serrated recess therein.

3. In a lathe, the combination with a bed, of a tool carriage and a tail stock movable thereon, a bar secured to said carriage, a clutch upon said tail stock adapted to engage said bar, a lead screw to move said carriage, and means upon said tail stock to engage said screw.

4. In a lathe, the combination with a bed, of a tool carriage and a tail stock movable thereon, and a bar connected to one of said movable members and adjustably connected to the other of said movable members, whereby the movement of one of said members will move the other.

5. In a lathe, the combination with a bed, of a tool carriage and a tail stock movable thereon, a bar secured to said carriage, and a clutch upon said tail stock engaging said bar.

6. In a lathe, the combination with a bed, of a tool carriage and a tail stock movable thereon, and means secured to one of said movable members and adjustably secured to the other, whereby the movement of one will move the other, means to move said carriage, and means upon said tail stock to engage said carriage moving means.

In witness whereof, I have hereunto set my hand this 23rd day of March, 1908.

ISAAC A. WENDELL.

Witnesses:
 A. I. GARDNER,
 ALEXANDER PARK.